United States Patent
Tzur et al.

(10) Patent No.: US 12,002,058 B2
(45) Date of Patent: Jun. 4, 2024

(54) CUSTOMER SERVICE TICKET PROCESSING USING CLUSTER-BASED DATA DRIVEN GUIDEBOOKS

(71) Applicant: Dell Products L.P., Round Rock, TX (US)

(72) Inventors: Anat Parush Tzur, Beer Sheva (IL); Amihai Savir, Sansana (IL); Avitan Gefen, Tel Aviv (IL)

(73) Assignee: Dell Products L.P., Round Rock, TX (US)

( * ) Notice: Subject to any disclaimer, the term of this patent is extended or adjusted under 35 U.S.C. 154(b) by 539 days.

(21) Appl. No.: 16/864,396

(22) Filed: May 1, 2020

(65) Prior Publication Data
US 2021/0342857 A1 Nov. 4, 2021

(51) Int. Cl.
*G06Q 30/016* (2023.01)
*G06F 16/338* (2019.01)
(Continued)

(52) U.S. Cl.
CPC ......... *G06Q 30/016* (2013.01); *G06F 16/338* (2019.01); *G06F 16/35* (2019.01); *G06N 20/00* (2019.01)

(58) Field of Classification Search
CPC ..... G06Q 30/016; G06F 16/338; G06F 16/35; G06N 20/00; G06N 5/003; G06N 7/005
See application file for complete search history.

(56) References Cited

U.S. PATENT DOCUMENTS 7,493,325 B1 * 2/2009 Bhatnagar ............... G06F 16/30
707/999.102
11,023,774 B2 * 6/2021 Nefedov ............. G06F 16/2471
(Continued)

FOREIGN PATENT DOCUMENTS

WO WO-2005050401 A2 * 6/2005 ............. G06Q 10/06

OTHER PUBLICATIONS

Safavian et al. A Survey of Decision Tree Classifier Methodology. IEEE Transactions on Systems, Man, and Cybernetics. vol. 21, No. 3, May/Jun. 1991. Sep. 8, 2022 <https://ieeexplore.ieee.org/stamp/stamp.jsp?tp=&arnumber=97458> (Year: 1991).*
(Continued)

*Primary Examiner* — Andrew B Whitaker
*Assistant Examiner* — Shaun D Sensenig
(74) *Attorney, Agent, or Firm* — Ryan, Mason & Lewis, LLP

(57) ABSTRACT

Techniques are provided for customer service ticket processing using cluster-based data driven guidebooks. One method comprises obtaining a customer service ticket; extracting features related to the customer service ticket, wherein the features comprise a representation of a problem associated with the customer service ticket; assigning the customer service ticket to a given cluster of multiple customer service ticket clusters based on the features; obtaining a customer service ticket processing guidebook associated with the given cluster that identifies independent actions to perform to address the problem; and processing the customer service ticket based on the customer service ticket processing guidebook. A customer service ticket processing guidebook may be generated for each customer service ticket cluster using historical customer service tickets from the respective cluster. The customer service ticket processing guidebooks can be generated by clustering (i) possible independent actions and (ii) possible solutions identified in the historical customer service tickets of the given cluster.

20 Claims, 8 Drawing Sheets

(51) Int. Cl.
    *G06F 16/35*           (2019.01)
    *G06N 20/00*          (2019.01)

(56) References Cited

U.S. PATENT DOCUMENTS

| | | | |
|---|---|---|---|
| 2015/0195154 A1* | 7/2015 | Hevizi | H04L 41/16 |
| | | | 706/50 |
| 2016/0283889 A1* | 9/2016 | Shukla | G06Q 10/063114 |
| 2018/0329768 A1* | 11/2018 | Bikumala | G06F 11/079 |
| 2019/0026489 A1* | 1/2019 | Nerurkar | G06N 20/00 |
| 2019/0228315 A1* | 7/2019 | Xu | G06F 9/453 |
| 2019/0392310 A1* | 12/2019 | Sabharwal | G06F 11/0751 |
| 2020/0065151 A1* | 2/2020 | Ghosh | G06F 40/30 |
| 2021/0014260 A1* | 1/2021 | Singh | H04L 41/0253 |

OTHER PUBLICATIONS https://en.wikipedia.org/wiki/Word2vec, downloaded on Apr. 23, 2020.
http://www.jmlr.org/papers/volume3/blei03a/blei03a.pdf, downloaded on Apr. 23, 2020.
https://en.wikipedia.org/wiki/Feature_engineering, downloaded on Apr. 23, 2020.
https://www.kaggle.com/fazilbtopal/popular-unsupervised-clustering-algorithms, downloaded on Apr. 23, 2020.
https://en.wikipedia.org/wiki/Information_gain_in_decision_trees, downloaded on Apr. 23, 2020.

* cited by examiner

|  | ACTION 1 | ACTION 2 | ACTION 3 | ACTION 4 | ACTION 5 | SOLUTION TOPIC |
|---|---|---|---|---|---|---|
| TICKET 1 | FALSE | TRUE | FALSE | FALSE | FALSE | SOLUTION 1 |
| TICKET 2 | FALSE | TRUE | FALSE | FALSE | TRUE | SOLUTION 2 |
| TICKET 3 | FALSE | TRUE | TRUE | FALSE | FALSE | SOLUTION 3 |
| TICKET 4 | FALSE | FALSE | FALSE | FALSE | TRUE | SOLUTION 2 |
| TICKET 5 | FALSE | TRUE | FALSE | TRUE | TRUE | SOLUTION 3 |

FIG. 4A

CUSTOMER SERVICE TICKET PROCESSING USING CLUSTER-BASED DATA DRIVEN GUIDEBOOKS

FIELD

The field relates generally to information processing, and more particularly, to the processing of customer service tickets.

BACKGROUND

Customer service requests are often documented using customer service tickets. In the field of IT (Information Technology), for example, a ticketing system is often used to manage IT tickets. There is often a large number of customer service tickets to be processed within a given organization. In the IT context, a large number of customer service tickets are often encountered, for example, when a server fails or when a failure occurs with one or more devices or systems of a user or of the organization.

Customer service tickets are often processed using ticket processing guidebooks that provide suggestions for investigating and/or resolving the applicable customer service tickets. It is often challenging, however, to identify the best ticket processing guidebook to employ for a given customer service ticket and to keep the ticket processing guidebooks updated.

A need therefore exists for techniques for processing customer service tickets.

SUMMARY

In one embodiment, a method comprises obtaining a customer service ticket; extracting a plurality of features related the customer service ticket, wherein the plurality of features comprises a representation of a problem associated with the customer service ticket; assigning the customer service ticket to a given cluster of a plurality of clusters of customer service tickets based at least in part on the plurality of features; obtaining a customer service ticket processing guidebook associated with the given cluster, wherein the customer service ticket processing guidebook identifies one or more independent actions to perform to address the problem and wherein the customer service ticket processing guidebook was generated using machine learning techniques applied to a plurality of historical customer service tickets from the given cluster; and processing the customer service ticket based at least in part on the customer service ticket processing guidebook.

In some embodiments, a customer service ticket processing guidebook is generated for each of the plurality of clusters of customer service tickets using a plurality of historical customer service tickets from the respective cluster. In one or more embodiments, the customer service ticket processing guidebook associated with the given cluster is generated by: (i) clustering a first set of possible independent actions identified in the plurality of historical customer service tickets from the given cluster, and (ii) clustering a second set of possible solutions identified in the plurality of historical customer service tickets from the given cluster.

Other illustrative embodiments include, without limitation, apparatus, systems, methods and computer program products comprising processor-readable storage media.

BRIEF DESCRIPTION OF THE DRAWINGS

FIG. 4A illustrates a number of independent actions that were performed to address a number of historical customer service tickets and a number of solutions that were identified for such historical customer service tickets, according to an embodiment of the disclosure;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for customer service ticket processing using cluster-based data driven guidebooks.

As noted above, it is often challenging to identify the best available ticket processing guidebook to employ for a given customer service ticket and to keep the ticket processing guidebooks updated. In one or more embodiments, customer service ticket processing techniques are provided that cluster new customer service tickets into particular clusters of customer service tickets based on features extracted from the new customer service tickets. Each cluster is based on data from similar problems and has an associated service ticket processing guidebook that identifies one or more possible actions to perform to help resolve customer service tickets associated with the cluster.

In some embodiments, the guidebook associated with each service ticket cluster can be generated in advance based on historical customer service tickets (e.g., with no dependence on any new customer service tickets that need to be resolved). The possible actions outlined in the service ticket processing guidebook for each cluster can be ordered based on a placement in the root nodes of classification decision trees that are iteratively built in advance based on data extracted from the historical customer service tickets.

Thereafter, when a new customer service ticket is processed, for example, in real-time, the new customer service ticket is assigned to one of the clusters of customer service tickets, the associated ticket processing guidebook for the assigned cluster is identified, and the guidebook is followed to perform the specified actions based on the order indicated in the guidebook until the ticket is resolved.

Figure 1:
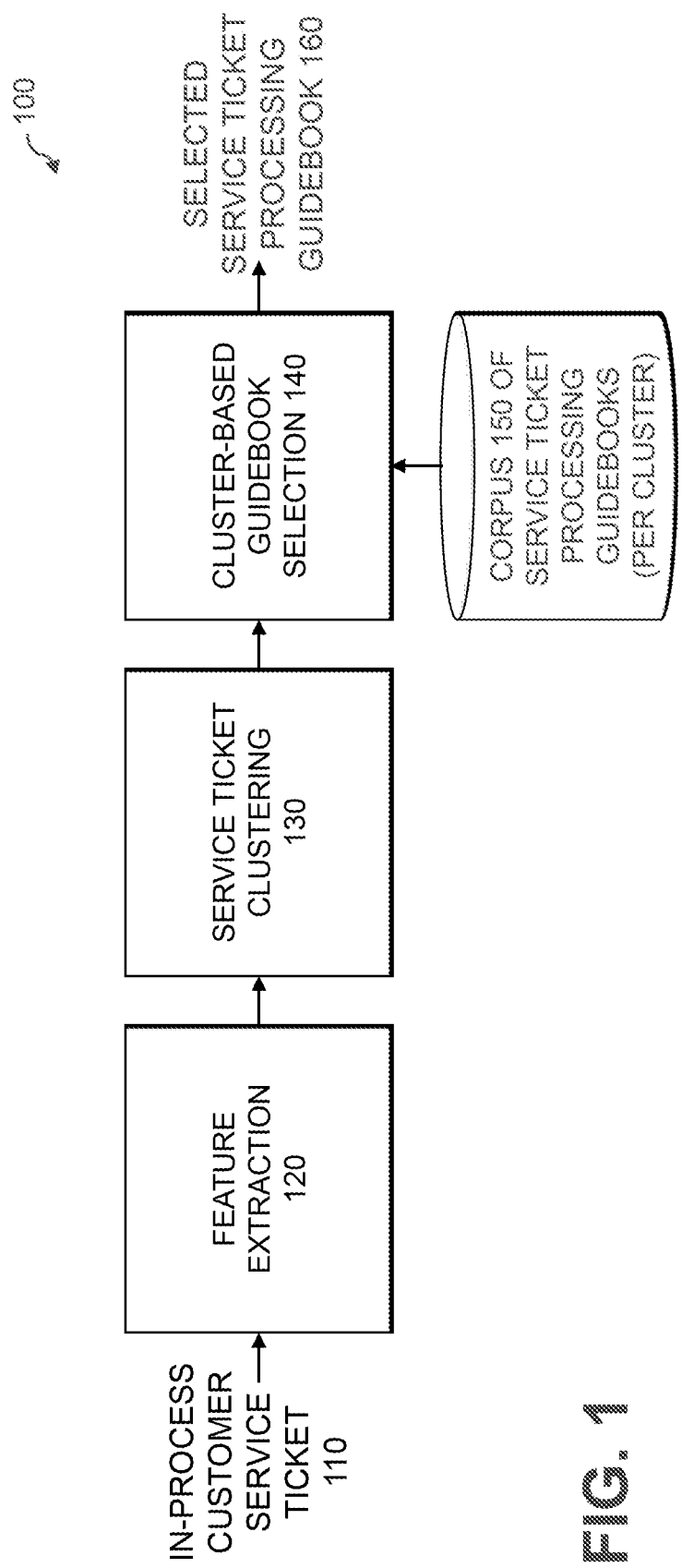
FIG. 1 illustrates an exemplary customer service ticket processing system for a new customer service ticket, according to an embodiment of the disclosure.

FIG. 1 illustrates an exemplary customer service ticket processing system 100 for processing a new customer service ticket, according to an embodiment of the disclosure. In the example of FIG. 1, it is assumed that the training phase for the full customer service ticket processing system of FIG. 2 has been performed using historical customer service tickets to generate data driven service ticket processing guidebooks for each cluster (which provide the corpus 150 of service ticket processing guidebooks per cluster shown in FIG. 1, and discussed below).

As shown in FIG. 1, one or more in-process (e.g., real-time) customer service tickets 110 are applied to a feature extraction module 120 that extracts a number of extracted features from each customer service ticket 110. Each customer service ticket 110 typically comprises a representation of the problem associated with the respective customer service ticket. In some embodiments, a numerical representation (e.g., in an N-dimensional space) is generated for the issue(s) associated with a given customer service ticket 110, so that calculations and/or modeling can be applied to the customer service ticket 110.

In one or more embodiments, the exemplary feature extraction module 120 applies one or more of topic modeling, natural language processing (NLP) and/or word embedding (e.g., Doc2Vec) techniques to assign a numerical representation to each customer service ticket 110. For example, the issue and semantics of each customer service ticket 110 can be extracted by applying text embedding techniques, such as Doc2Vec.

In some embodiments, the feature extraction module extracts information regarding activities performed to address the customer service ticket and textual information describing at least a portion of the customer service ticket, such as a problem description, a ticket issuance time of the customer service ticket 110, device and line of business. In addition, the exemplary feature extraction module 120 optionally determines a frequency of activities performed to address the customer service ticket, product information, customer information (e.g., customer ticket records) and install base information (e.g., specific device ticket records and similar devices ticket records).

Each data source used to extract features for the customer service ticket 110 may be treated differently in some embodiments by applying a feature extraction technique appropriate for the particular data source. For example, for free text fields, a TfIdfVectorizer can be used to extract numerical features from text. Likewise, descriptive statistics (such as a median) can be extracted for time series data (e.g., for a specific device), such as a number of tickets generated in the last month on a weekly basis.

The extracted features are applied to a service ticket clustering module 130 that assigns the customer service ticket 110 to a particular cluster of customer service tickets, as discussed further below in conjunction with FIG. 2. For example, using the extracted features for a given customer service ticket 110, k-nearest neighbors can be extracted from the space of the embedded problems already built using a set of resolved historical customer service tickets 210, as discussed further below in conjunction with FIG. 2.

The assigned cluster for the customer service ticket 110 is used by a cluster-based guidebook selection module 140 to select, for the customer service ticket 110, a particular service ticket processing guidebook 160 associated with the assigned cluster from the corpus 150 of per-cluster service ticket processing guidebooks.

Figure 2:
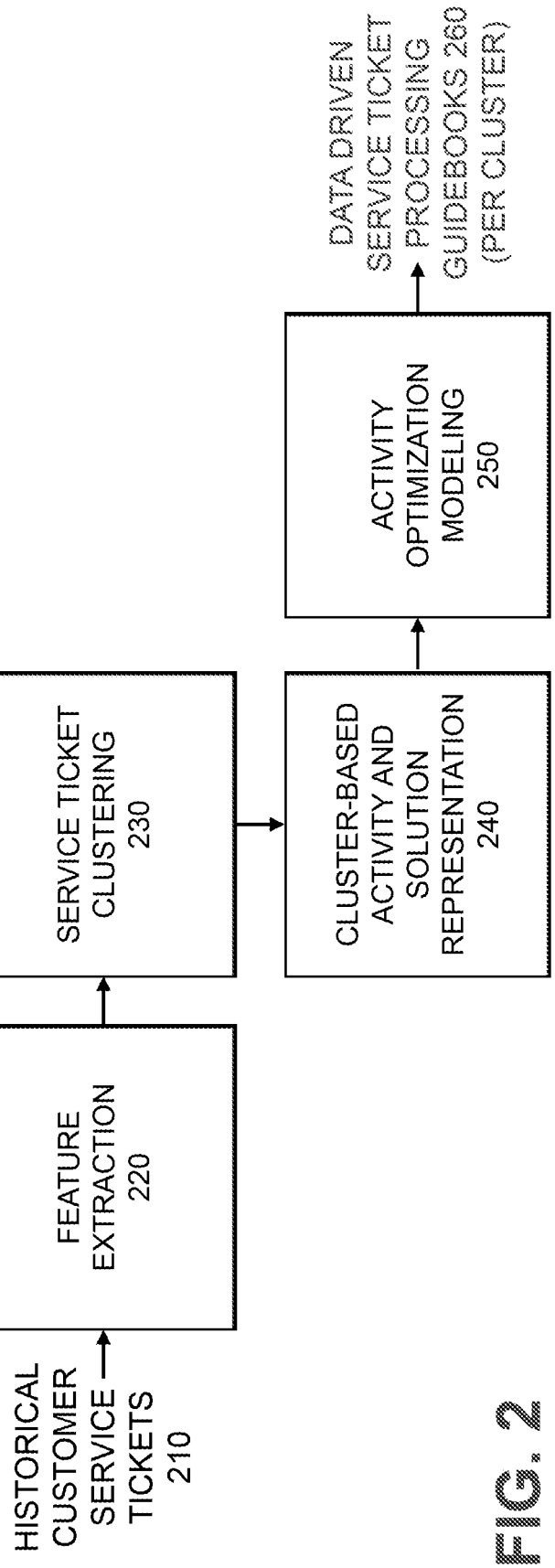
FIG. 2 illustrates portions of the exemplary customer service ticket processing system of FIG. 1 during a training phase using historical customer service tickets, according to at least one embodiment.

FIG. 2 illustrates portions of the exemplary customer service ticket processing system of FIG. 1 during a training phase using historical customer service tickets 210, according to at least one embodiment. As shown in FIG. 2, a plurality of historical customer service tickets 210 are applied to a feature extraction module 220 that extracts a number of extracted features. In some embodiments, the feature extraction module extracts dynamic information regarding activities performed to address the customer service ticket and textual information describing at least a portion of the customer service ticket, in a similar manner as the feature extraction module 120 of FIG. 1.

The extracted features are applied to a service ticket clustering module 230 that assigns the historical customer service ticket 210 to a particular cluster of customer service tickets (e.g., associated with "similar" customer service tickets having "similar" features), in a similar manner as FIG. 1. In some embodiments, the exemplary service ticket clustering module 230 employs an unsupervised learning model to cluster the historical customer service tickets 210. For example, the models employed by the exemplary service ticket clustering module 230 may comprise a K-means model and a Latent Dirichlet Allocation (LDA) topic modeling model. Known techniques may optionally be employed to select a number of clusters without having knowledge about the clusters. Generally, a separate service ticket processing guidebook is generated using the disclosed techniques for each cluster generated by the service ticket clustering module 230.

The clusters generated by the service ticket clustering module 230 for the historical customer service tickets 210 are used by a cluster-based activity and solution representation module 240 to extract features of the activities and solutions associated with the historical customer service tickets 210 and to learn a correct set of steps to perform to address each cluster of historical customer service tickets 210.

Generally, for a cluster of resolved historical customer service tickets 210 of the same (or similar) problem, the exemplary cluster-based activity and solution representation module 240 defines: (i) a set of possible independent unique actions; and (ii) a set of possible unique solutions. In one or more embodiments, multiple actions associated with the resolved historical customer service tickets 210 that have an ordering (time) constraint or other dependencies (e.g., actions that must be performed in a particular sequence) are grouped into independent actions (also referred to as atomic actions). For example, when two or more actions are frequently observed as being performed in a particular order by the cluster-based activity and solution representation module 240, the two or more actions will be grouped into one independent action.

In one or more embodiments, the cluster-based activity and solution representation module 240 may employ statistical inference, topic modeling, NLP and/or machine learning techniques to define a unique set of actions and solutions associated with the resolved historical customer service tickets 210, discussed further below in conjunction with FIG. 3. For example, the cluster-based activity and solution representation module 240 may cluster similar actions into an action cluster and cluster similar solutions together into a solution cluster (e.g. to reduce the number of possible actions and possible solutions).

The activity optimization modeling module 250 generates a data driven service ticket processing guidebook 260 for each of the generated clusters, as discussed further below in conjunction with FIGS. 4A and 4B.

Figure 3:
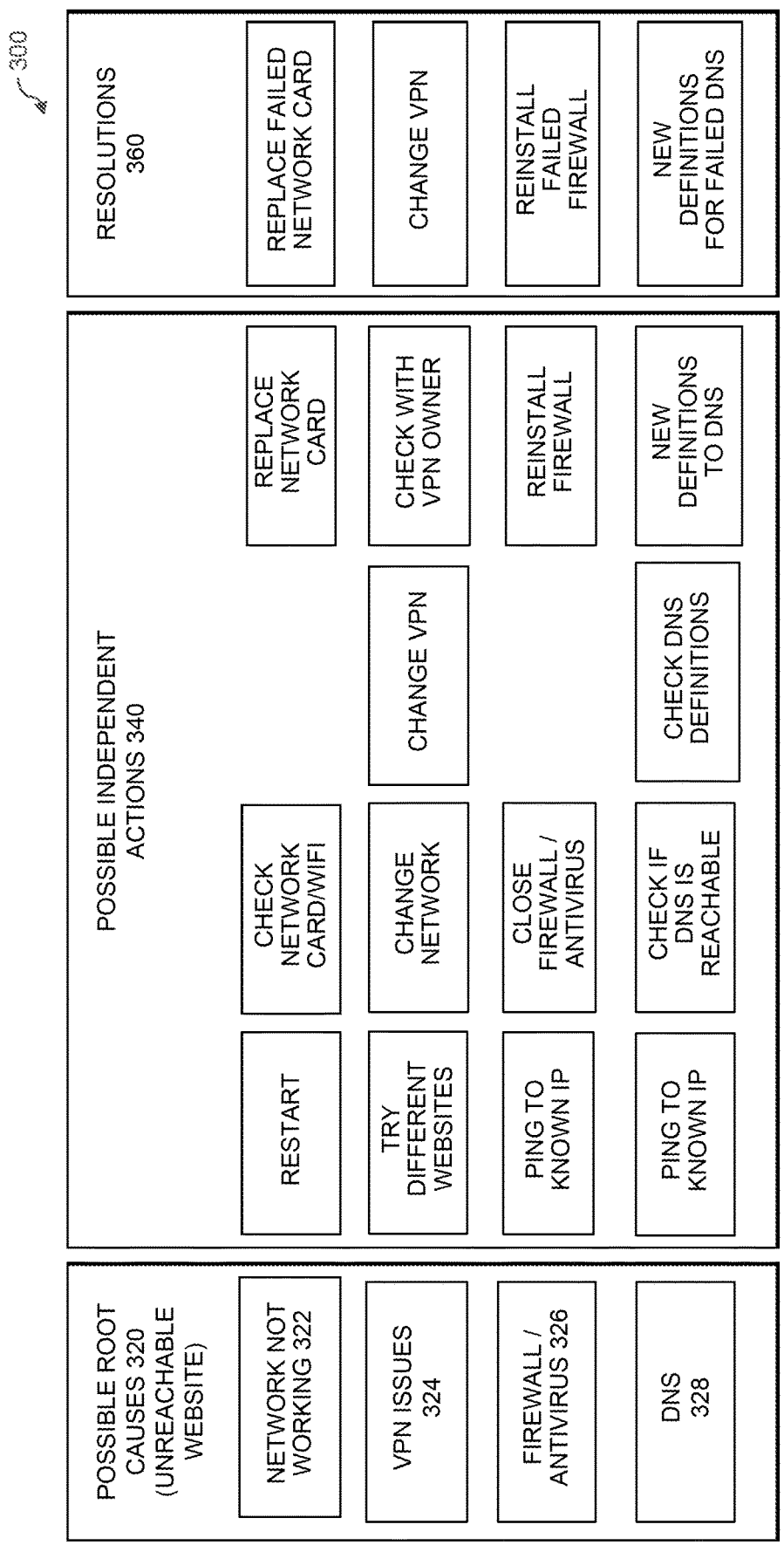
FIG. 3 illustrates a number of possible root causes, possible independent actions that can be performed, and a number of possible resolutions for different customer service tickets, according to one or more embodiments of the disclosure.

FIG. 3 is a sample table 300 illustrating a number of possible root causes 320, possible independent actions 340 that can be performed for each possible root cause 320, and a number of possible resolutions 360 for customer service tickets associated with a particular problem description, according to one or more embodiments of the disclosure. In some embodiments, a user may provide a description of a problem associated with a given customer service ticket. The problem description may be used to identify one or more possible root causes that should be further investigated. For example, a problem described as an "unreachable website" may have the possible root causes 320 of network not working 322; VPN Issues 324; firewall/antivirus 326 and DNS problems 328, as shown in FIG. 3. For a given problem description, there may be numerous possible actions to perform to resolve the particular problem.

In one or more embodiments, as discussed above, multiple actions that have an ordering (time) constraint (e.g., actions that must be performed in a particular sequence) are grouped into independent actions (also referred to as atomic actions). For example, when two or more actions are frequently observed as being performed in a particular order by the cluster-based activity and solution representation module 240, the two or more actions will be grouped into one independent action.

As shown in FIG. 3, for each possible root cause 320, the table 300 identifies one or more possible independent actions 340 (for example, in the same row of the table 300 as the respective possible root cause 320) that can be performed to investigate and/or resolve a particular customer service ticket, resulting in a particular associated resolution 360. For example, for a possible root cause 326 of a website access problem related to the firewall and/or antivirus software, the possible independent actions may comprise pinging a known IP address, closing the firewall and/or antivirus software, and reinstalling the firewall, as shown in FIG. 3. If one of these actions is successful, the resolution 360 may be, for example, reinstalling the firewall.

FIG. 4A is a sample table 400 illustrating a number of independent actions that were performed to address a number of historical customer service tickets and a number of solutions that were identified for such historical customer service tickets, according to an embodiment of the disclosure. In the example of FIG. 4A, the sample table 400 is comprised of five activities and three solutions for a set of five tickets from the historical customer service tickets 210, where each row represents a particular ticket and the columns are all of the atomic actions of the selected tickets. Each selected ticket has a label which is the solution bucket. A value of true in the table 400 indicates that a particular action was performed for a particular ticket (e.g., each atomic action has a binary value of 1 if the corresponding action was performed and a binary value of 0 otherwise). In some embodiments, activity and solution representations are used to build a dataset.

The data from the sample table 400 is processed to generate a classification model, for example, using decision tree techniques with binary features and a fixed set of labels. An exemplary decision tree 450 based on the data of the table 400 is discussed further below in conjunction with FIG. 4B. For the exemplary decision tree classifier, the action associated with the root node gives the highest information gain in some embodiments (e.g., the action that is the most differential action (or discriminating action)). For example, Action 5 is the most differential action as it comprises two false values and three true values and separates the available data the most.

A classification tree is iteratively generated and the action that was chosen by the decision tree classification techniques to be associated with the root node of the decision tree is performed at each iteration. After each iteration, the column of data in the table 400 is removed when the associated action is performed at the root node. In addition, any rows in the table 400 where the remaining values are all (or mostly) "false" (e.g., rows associated with a ticket where the only action that was performed has already been performed for another ticket) are removed. A new decision tree is generated for the modified version of table 400 at each iteration. The iterative process is repeated until a resolution is reached. For example, after Action 5 is performed and the associated column of data is deleted from the table 400, all of the activities associated with ticket 4 now have a value of "false" and ticket 4 is deleted from the table 400.

Figure 4B:
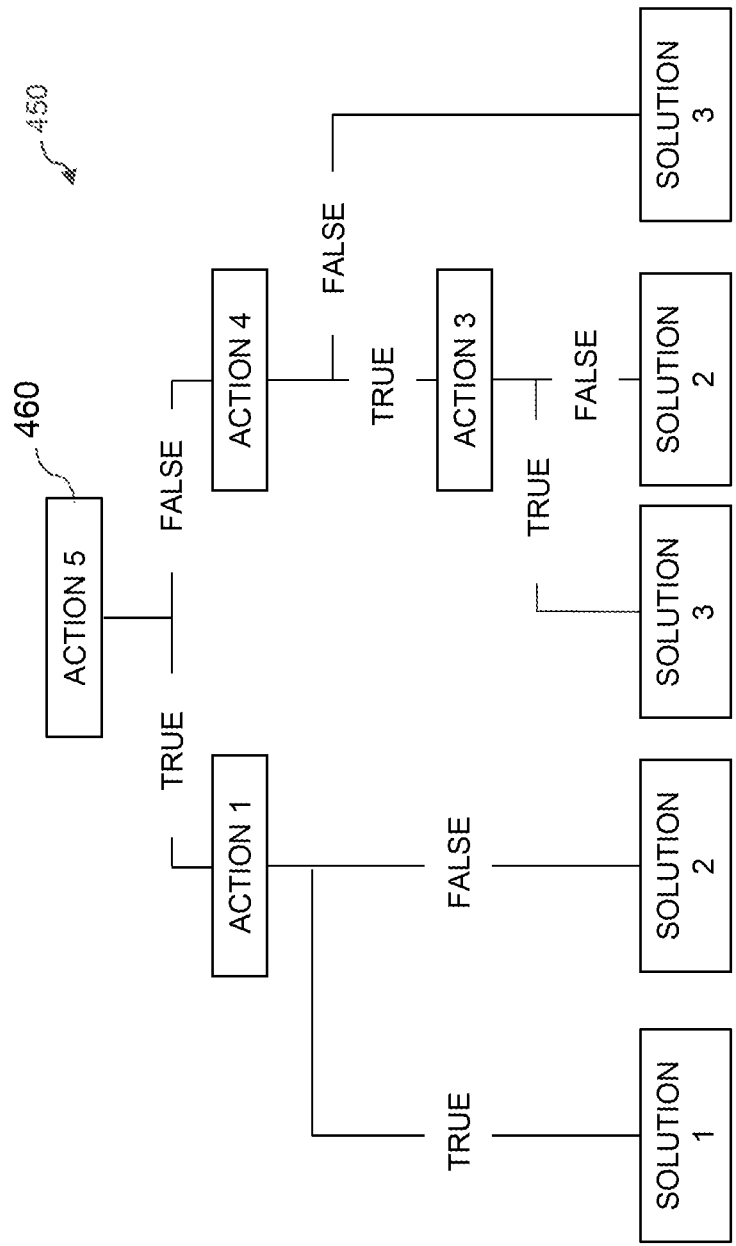
FIG. 4B illustrates an exemplary decision tree for the resolution of the historical customer service tickets of FIG. 4A, according to some embodiments.

FIG. 4B illustrates an exemplary decision tree 450 for the resolution of the historical customer service tickets of FIG. 4A, according to some embodiments. In the example of FIG. 4B, Action 5 was selected as the root node 460 by applying decision tree classification techniques to the table 400. Generally, the exemplary decision tree calculates the entropy of each action in order to find the best route for a solution. Each iterative decision tree indicates the action that should be performed in the root node 460. As noted above, the selected action in the root node 460 has the highest information gain (e.g., is the most differential action).

Figure 5:
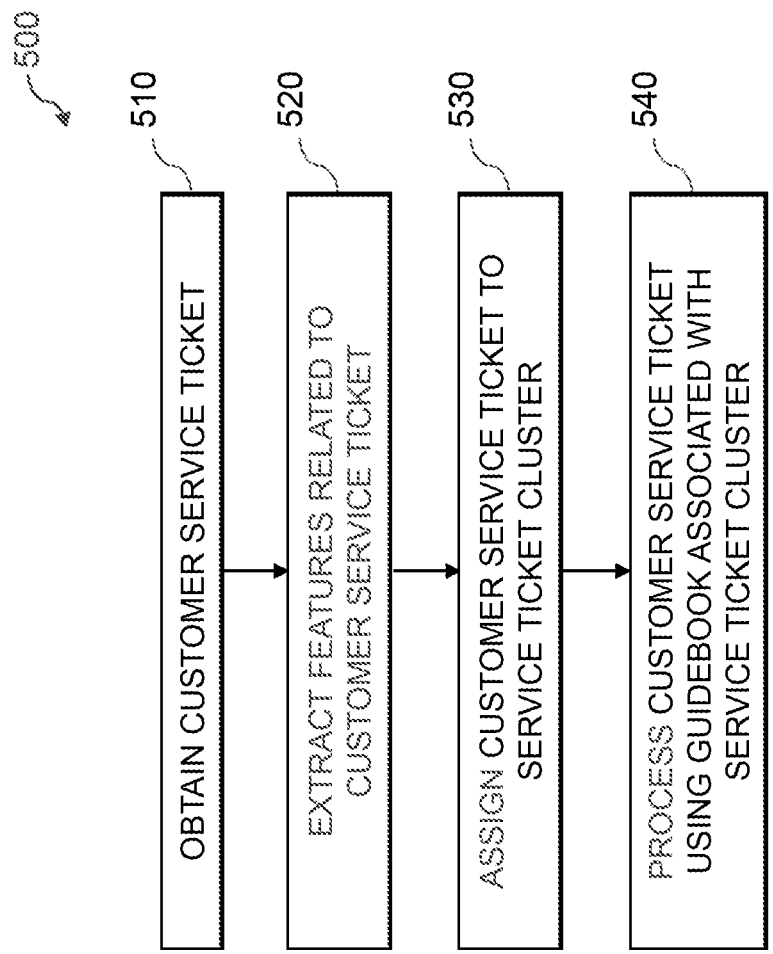
FIG. 5 is a flow chart illustrating a customer service ticket processing process that uses cluster-based data driven guidebooks, according to one or more embodiments.

FIG. 5 is a flow chart illustrating a customer service ticket processing process 500 that uses cluster-based data driven guidebooks, according to one or more embodiments. As shown in FIG. 5, the exemplary customer service ticket processing process 500 initially obtains a customer service ticket during step 510 and extracts a plurality of features related to the customer service ticket during step 520. In some embodiments, the plurality of features comprises a representation of a problem associated with the customer service ticket.

During step 530, the exemplary customer service ticket processing process 500 assigns the customer service ticket to a given cluster of a plurality of clusters of customer service tickets, for example, using an unsupervised clustering technique, based on the plurality of extracted features. Finally, the customer service ticket is processed during step 540 based on the customer service ticket processing guidebook associated with the given cluster. Generally, as indicated above, the customer service ticket processing guidebook identifies one or more independent actions to perform to address the problem. The customer service ticket processing guidebook was generated using a plurality of historical customer service tickets from the given cluster, as discussed above in conjunction with FIG. 2.

As noted above, in some embodiments, the plurality of features related the customer service ticket may be extracted by assigning a numerical representation to one or more issues associated with the customer service ticket. In addition, the customer service ticket processing guidebook associated with the given cluster is generated in some embodiments by: (i) clustering a set of possible independent actions identified in the plurality of historical customer service tickets from the given cluster, and (ii) clustering a set of possible solutions identified in the plurality of historical customer service tickets from the given cluster. In this manner, a plurality of dependent actions, obtained from the plurality of historical customer service tickets from the given cluster, performed in a given order are grouped into a single independent action.

Among other benefits, the disclosed customer service ticket processing techniques identify the best ticket processing guidebook to employ for a given customer service ticket and keep the ticket processing guidebooks updated.

One or more embodiments of the disclosure provide improved methods, apparatus and computer program products for customer service ticket processing using cluster-based data driven guidebooks. The foregoing applications and associated embodiments should be considered as illustrative only, and numerous other embodiments can be configured using the techniques disclosed herein, in a wide variety of different applications.

It should also be understood that the disclosed customer service ticket processing techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for processing customer service ticket may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based customer service ticket processing system 100, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based customer service ticket processing platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. These platforms may also be used to implement at least portions of other information processing systems in other embodiments.

Figure 6:
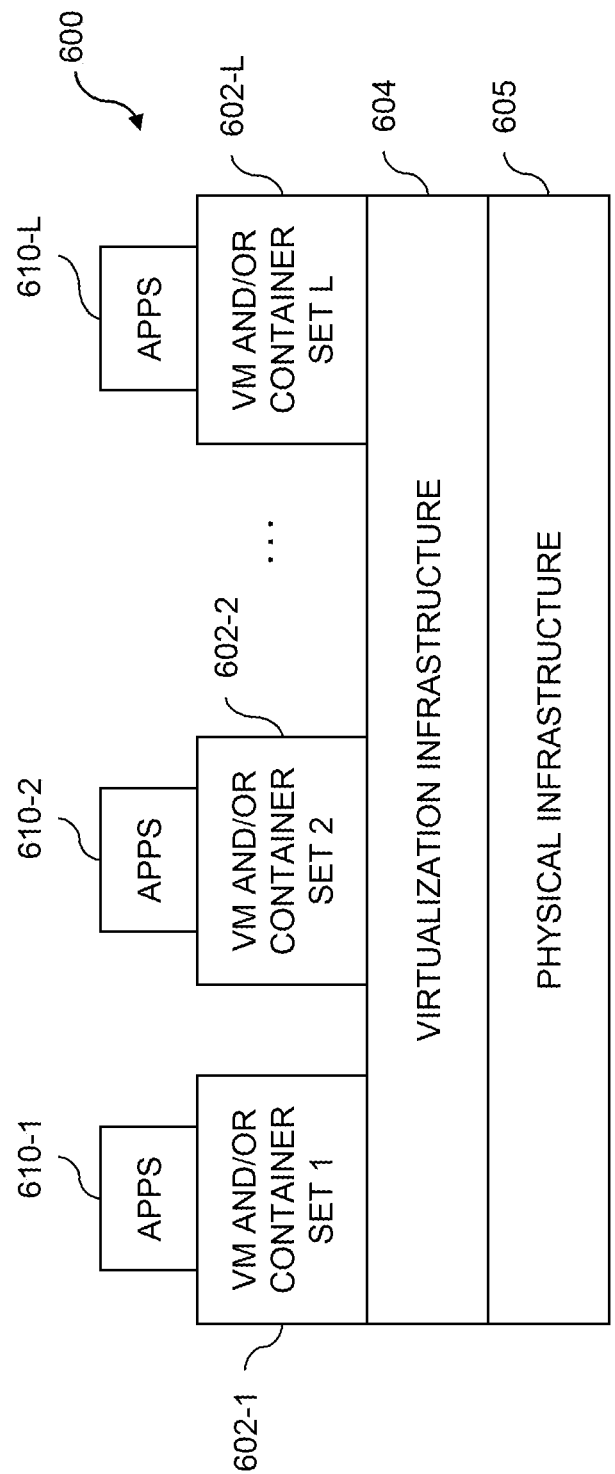
FIG. 6 illustrates an exemplary processing platform that may be used to implement at least a portion of one or more embodiments of the disclosure comprising a cloud infrastructure.

FIG. 6 shows an example processing platform comprising cloud infrastructure 600. The cloud infrastructure 600 comprises a combination of physical and virtual processing resources that may be utilized to implement at least a portion of the customer service ticket processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. Such implementations can provide customer service ticket processing functionality of the type described above for one or more processes running on a given one of the VMs. For example, each of the VMs can implement customer service ticket processing control logic and feature extraction and clustering techniques for providing customer service ticket processing functionality for one or more processes running on that particular VM.

An example of a hypervisor platform that may be used to implement a hypervisor within the virtualization infrastructure 604 is the VMware® vSphere® which may have an associated virtual infrastructure management system such as the VMware® vCenter™. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system. Such implementations can provide customer service ticket processing functionality of the type described above for one or more processes running on different ones of the containers. For example, a container host device supporting multiple containers of one or more container sets can implement one or more instances of customer service ticket processing control logic and feature extraction and clustering techniques for use in processing customer service tickets.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises at least a portion of the given system and includes a plurality of processing devices, denoted 702-1, 702-2, 702-3, . . . 702-K, which communicate with one another over a network 704. The network 704 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application specific integrated circuit (ASIC), a field programmable gate array (FPGA) or other type of processing circuitry, as well as portions or combinations of such circuitry elements, and the memory 712, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the given system may include additional or alternative processing platforms, as well as numerous distinct processing platforms in any combination, with each such platform comprising one or more computers, storage devices or other processing devices.

Figure 7:
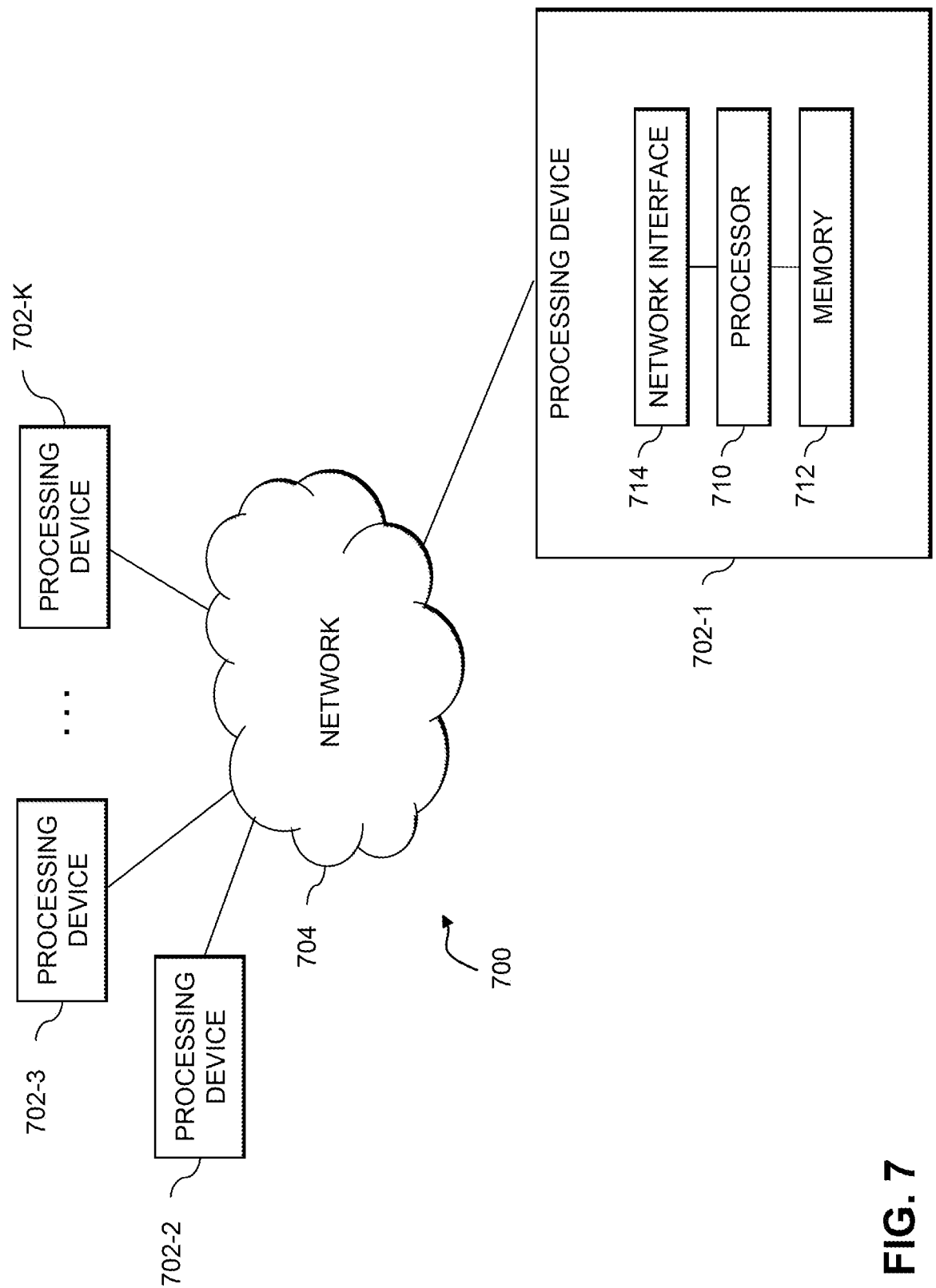
FIG. 7 illustrates another exemplary processing platform that may be used to implement at least a portion of one or more embodiments of the disclosure.

Multiple elements of an information processing system may be collectively implemented on a common processing platform of the type shown in FIG. 6 or 7, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:
1. A method, comprising:
obtaining a plurality of clusters of historical customer service data records, wherein a clustering of the historical customer service data records is based at least in part on a plurality of features extracted from the historical customer service data records;
obtaining a plurality of processor-readable data record processing guidebooks, wherein each of the plurality of processor-readable data record processing guidebooks is associated with a different cluster of the plurality of clusters, and wherein each of the processor-readable data record processing guidebooks is generated by performing the following steps for each of one or more of the plurality of clusters:

(i) extracting a plurality of activity features and a plurality of solution features from the historical customer service data records in the respective cluster;
(ii) clustering, within the respective cluster, a first set of possible independent computer-implemented actions, using the extracted plurality of activity features, identified in the plurality of historical customer service data records from the respective cluster, and
(iii) clustering, within the respective cluster, a second set of possible solutions, using the extracted plurality of solution features, identified in the plurality of historical customer service data records from the respective cluster;
performing the following steps, in response to obtaining a customer service data record to be processed, wherein the plurality of clusters and the plurality of processor-readable data record processing guidebooks are generated prior to the obtaining of the customer service data record to be processed:
processing the customer service data record to extract a plurality of features related to the customer service data record, wherein the plurality of features comprises a representation of a problem associated with the customer service data record;
processing the customer service data record to assign the customer service data record to a given cluster of the plurality of clusters of customer service data records based at least in part on the extracted plurality of features;
selecting, using the assigned given cluster, a given processor-readable data record processing guidebook of the plurality of processor-readable data record processing guidebooks, wherein the given processor-readable data record processing guidebook is associated with the assigned given cluster, wherein the given processor-readable data record processing guidebook identifies one or more independent computer-implemented actions to perform to address the problem; and
processing the customer service data record using at least one of the independent computer-implemented actions of the selected processor-readable data record processing guidebook;
wherein the method is performed by at least one processing device comprising a processor coupled to a memory.

2. The method of claim 1, wherein the processing the customer service data record to extract the plurality of features related to the customer service data record further comprises assigning a numerical representation to one or more issues associated with the customer service data record.

3. The method of claim 1, wherein the processing the customer service data record to assign the customer service data record to the given cluster of the plurality of clusters employs an unsupervised clustering technique.

4. The method of claim 1, further comprising generating the processor-readable data record processing guidebook for each of the plurality of clusters of customer service data records using a plurality of historical customer service data records from the respective cluster.

5. The method of claim 1, further comprising grouping a plurality of dependent computer-implemented actions, obtained from the plurality of historical customer service data records from the given cluster, performed in a given order, into a single independent computer-implemented action, such that the dependent computer-implemented actions are performed in the given order.

6. The method of claim 1, further comprising generating a classification model using binary features and a fixed set of labels obtained from the clustered first set of possible independent computer-implemented actions and the clustered second set of possible solutions.

7. The method of claim 6, wherein the classification model comprises one or more decision tree classifiers and wherein a root of each decision tree comprises a computer-implemented action providing a substantially highest information gain.

8. The method of claim 7, wherein the computer-implemented action providing the substantially highest information gain comprises the computer-implemented action that most discriminates the historical data in the plurality of historical customer service data records from the respective cluster.

9. A non-transitory processor-readable storage medium having stored therein program code of one or more software programs, wherein the program code when executed by at least one processing device causes the at least one processing device to perform the following steps:
obtaining a plurality of clusters of historical customer service data records, wherein a clustering of the historical customer service data records is based at least in part on a plurality of features extracted from the historical customer service data records;
obtaining a plurality of processor-readable data record processing guidebooks, wherein each of the plurality of processor-readable data record processing guidebooks is associated with a different cluster of the plurality of clusters, and wherein each of the processor-readable data record processing guidebooks is generated by performing the following steps for each of one or more of the plurality of clusters:
(i) extracting a plurality of activity features and a plurality of solution features from the historical customer service data records in the respective cluster;
(ii) clustering, within the respective cluster, a first set of possible independent computer-implemented actions, using the extracted plurality of activity features, identified in the plurality of historical customer service data records from the respective cluster, and
(iii) clustering, within the respective cluster, a second set of possible solutions, using the extracted plurality of solution features, identified in the plurality of historical customer service data records from the respective cluster;
performing the following steps, in response to obtaining a customer service data record to be processed, wherein the plurality of clusters and the plurality of processor-readable data record processing guidebooks are generated prior to the obtaining of the customer service data record to be processed:
processing the customer service data record to extract a plurality of features related to the customer service data record, wherein the plurality of features comprises a representation of a problem associated with the customer service data record;
processing the customer service data record to assign the customer service data record to a given cluster of the plurality of clusters of customer service data records based at least in part on the extracted plurality of features;

selecting, using the assigned given cluster, a given processor-readable data record processing guidebook of the plurality of processor-readable data record processing guidebooks, wherein the given processor-readable data record processing guidebook is associated with the assigned given cluster, wherein the given processor-readable data record processing guidebook identifies one or more independent computer-implemented actions to perform to address the problem; and processing the customer service data record using at least one of the independent computer-implemented actions of the selected processor-readable data record processing guidebook.

10. The non-transitory processor-readable storage medium of claim 9, wherein the processing the customer service data record to extract the plurality of features related to the customer service data record further comprises assigning a numerical representation to one or more issues associated with the customer service data record.

11. The non-transitory processor-readable storage medium of claim 9, wherein the processing the customer service data record to assign the customer service data record to the given cluster of the plurality of clusters employs an unsupervised clustering technique.

12. The non-transitory processor-readable storage medium of claim 9, further comprising generating the processor-readable data record processing guidebook for each of the plurality of clusters of customer service data records using a plurality of historical customer service data records from the respective cluster.

13. The non-transitory processor-readable storage medium of claim 9, further comprising grouping a plurality of dependent computer-implemented actions, obtained from the plurality of historical customer service data records from the given cluster, performed in a given order into a single independent computer-implemented action, such that the dependent computer-implemented actions are performed in the given order.

14. The non-transitory processor-readable storage medium of claim 9, further comprising generating a classification model using binary features and a fixed set of labels obtained from the clustered first set of possible independent computer-implemented actions and the clustered second set of possible solutions.

15. The non-transitory processor-readable storage medium of claim 14, wherein the classification model comprises one or more decision tree classifiers and wherein a root of each decision tree comprises a computer-implemented action providing a substantially highest information gain.

16. An apparatus comprising:
at least one processing device comprising a processor coupled to a memory;
the at least one processing device being configured to implement the following steps:
obtaining a plurality of clusters of historical customer service data records, wherein a clustering of the historical customer service data records is based at least in part on a plurality of features extracted from the historical customer service data records;
obtaining a plurality of processor-readable data record processing guidebooks, wherein each of the plurality of processor-readable data record processing guidebooks is associated with a different cluster of the plurality of clusters, and wherein each of the processor-readable data record processing guidebooks is generated by performing the following steps for each of one or more of the plurality of clusters:
 (i) extracting a plurality of activity features and a plurality of solution features from the historical customer service data records in the respective cluster;
 (ii) clustering, within the respective cluster, a first set of possible independent computer-implemented actions, using the extracted plurality of activity features, identified in the plurality of historical customer service data records from the respective cluster, and
 (iii) clustering, within the respective cluster, a second set of possible solutions, using the extracted plurality of solution features, identified in the plurality of historical customer service data records from the respective cluster;
performing the following steps, in response to obtaining a customer service data record to be processed, wherein the plurality of clusters and the plurality of processor-readable data record processing guidebooks are generated prior to the obtaining of the customer service data record to be processed:
processing the customer service data record to extract a plurality of features related to the customer service data record, wherein the plurality of features comprises a representation of a problem associated with the customer service data record;
processing the customer service data record to assign the customer service data record to a given cluster of the plurality of clusters of customer service data records based at least in part on the extracted plurality of features;
selecting, using the assigned given cluster, a given processor-readable data record processing guidebook of the plurality of processor-readable data record processing guidebooks, wherein the given processor-readable data record processing guidebook is associated with the assigned given cluster, wherein the given processor-readable data record processing guidebook identifies one or more independent computer-implemented actions to perform to address the problem; and
processing the customer service data record using at least one of the independent computer-implemented actions of the selected processor-readable data record processing guidebook.

17. The apparatus of claim 16, further comprising generating the processor-readable data record processing guidebook for each of the plurality of clusters of customer service data records using a plurality of historical customer service data records from the respective cluster.

18. The apparatus of claim 16, further comprising grouping a plurality of dependent computer-implemented actions, obtained from the plurality of historical customer service data records from the given cluster, performed in a given order into a single independent computer-implemented action, such that the dependent computer-implemented actions are performed in the given order.

19. The apparatus of claim 16, further comprising generating a classification model using binary features and a fixed set of labels obtained from the clustered first set of possible independent computer-implemented actions and clustered second set of possible solutions.

20. The apparatus of claim 19, wherein the classification model comprises one or more decision tree classifiers and wherein a root of each decision tree comprises a computer-implemented action providing a substantially highest information gain.

\* \* \* \* \*